(12) United States Patent
Berberich et al.

(10) Patent No.: US 11,408,489 B2
(45) Date of Patent: Aug. 9, 2022

(54) BELT DRIVE SYSTEM

(71) Applicant: Roche Diagnostics Operations, Inc., Indianapolis, IN (US)

(72) Inventors: Walter Berberich, Kirchheim/Teck (DE); Timo Ziegler, Marbach am Necker (DE); Benjamin Zoelch, Ehningen (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 345 days.

(21) Appl. No.: 16/597,896

(22) Filed: Oct. 10, 2019

(65) Prior Publication Data
US 2020/0124141 A1   Apr. 23, 2020

(30) Foreign Application Priority Data
Oct. 23, 2018 (EP) ..................................... 18202035

(51) Int. Cl.
*F16H 7/02* (2006.01)
*F16H 55/17* (2006.01)
*F16H 59/68* (2006.01)

(52) U.S. Cl.
CPC ........... *F16H 7/023* (2013.01); *F16H 55/171* (2013.01); *F16H 59/68* (2013.01); *F16H 2059/6823* (2013.01)

(58) Field of Classification Search
CPC ..... B65G 2207/48; B65G 43/00; B65G 43/08
(Continued)

(56) References Cited

U.S. PATENT DOCUMENTS 5,335,777 A * 8/1994 Murphy ................. B65G 43/08
                                                    198/349.8
7,812,735 B2 * 10/2010 Kahl .................... G03G 15/167
                                                    340/676

(Continued)

FOREIGN PATENT DOCUMENTS

DE         3904017 A1   8/1990
DE   102004041411 A1   4/2005
(Continued)

OTHER PUBLICATIONS

European Search Report dated Mar. 4, 2019, in Application No. 18202035.4, 2 pp.

*Primary Examiner* — Henry Y Liu
(74) *Attorney, Agent, or Firm* — Roche Diagnostics Operations, Inc.

(57) ABSTRACT

A drive system for driving a belt is presented. The system comprises a frame, a driving shaft connected to a motor, a controller, a driven shaft, two pulleys connected to the driven and driving shafts, and a belt. The frame supports the driving and driven shafts to mount the belt on the pulleys. A signal element is mounted on and drives with the belt. At least two detection elements are mounted on the frame so that when the signal element passes the detection elements, a signal is generated as the belt moves. The detector elements are connected to a controller which controls the motor so that when the system starts, the belt moves until the signal element generates a signal in a first detector element to fix a zero point of the belt movement. The signal of the second detector element checks the zero point during normal drive operation.

15 Claims, 2 Drawing Sheets

(58) Field of Classification Search
USPC .............................................. 198/339.1, 340
See application file for complete search history.

(56) References Cited

U.S. PATENT DOCUMENTS

| | | | |
|---|---|---|---|
| 8,839,949 B2 * | 9/2014 | Vogeley, Jr. ............ | B65G 43/08 198/810.03 |
| 2008/0061998 A1 * | 3/2008 | Kahl .................... | G03G 15/167 340/676 |
| 2009/0120768 A1 * | 5/2009 | Kusel .................... | B65G 43/02 198/810.02 |
| 2013/0341156 A1 * | 12/2013 | Vogeley, Jr. ............ | B26D 5/007 198/340 |

FOREIGN PATENT DOCUMENTS

| | | | |
|---|---|---|---|
| WO | 2013/113764 A1 | 8/2013 | |
| WO | 2016/177883 A1 | 11/2016 | |
| WO | 2018/059755 A1 | 4/2018 | |

\* cited by examiner

BELT DRIVE SYSTEM

CROSS-REFERENCE TO RELATED APPLICATIONS

This application claims priority to EP 18202035.4, filed Oct. 23, 2018, which is hereby incorporated by reference.

BACKGROUND

The present disclosure generally relates to a belt drive system.

Belt drive systems to transport devices or holders for devices or tools on the belt or to drive an axis of a manipulator are known.

However, there is a need for an advanced belt drive system which is easy to use and reliable.

SUMMARY

According to the present disclosure, a belt drive system for driving a belt is presented. The belt drive system can comprise a frame, a driving shaft connected to a motor, a controller, a driven shaft, two pulleys connected to the driven shaft and driving shaft respectively, and a belt. The frame can support the driving shaft and driven shaft so that the belt can be mounted on the pulleys. The belt drive system can also comprise a signal element mounted on the belt so that the signal element drives with the belt and at least two detection elements mounted at the frame so that when the signal element passes by the detection elements, a signal is generated by the passing by of the signal element. The detector elements can be connected to the controller. The controller can be configured to control the motor so that in a starting operation of the belt drive system, the belt can move until the signal element generates a signal in a first detector element of the at least two detector elements to fix a zero point in space of the belt movement. The controller can be configured to receive and use the signal of the second detector element to check the zero point in space during normal operation of the belt drive system.

Accordingly, it is a feature of the embodiments of the present disclosure to provide an advanced belt drive system which is easy to use and reliable. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
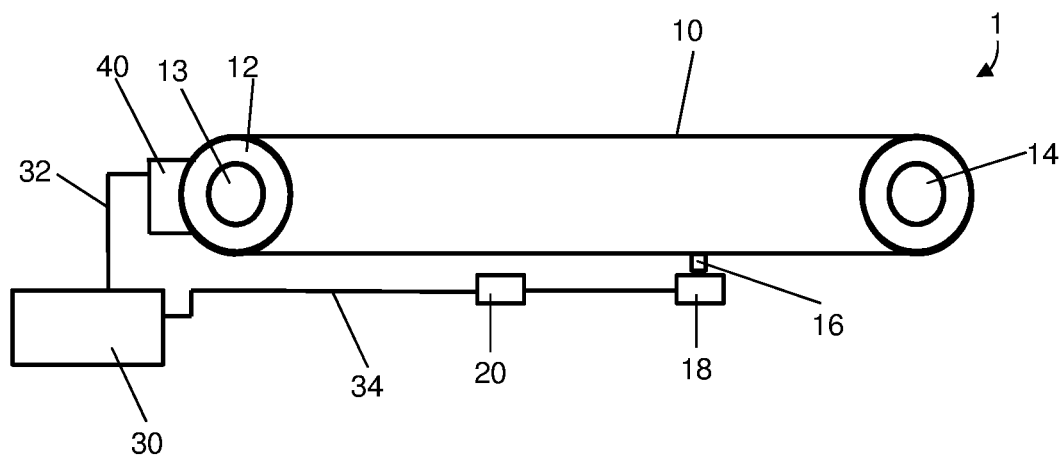
FIG. 1 illustrates a schematic side view according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A belt drive system for driving a belt is presented. The belt drive system can comprise a frame, a driving shaft connected to a motor, a controller, a driven shaft, two pulleys connected to the driven shaft and the driving shaft respectively, and a belt. The frame can support the driving shaft and driven shaft so that the belt can be mounted on the pulleys. A signal element can be mounted on the belt so that the signal element can drive with the belt. At least two detection elements can be mounted at the frame so that the signal element can pass by the detection elements to generate a signal by passing by when the belt moves. The detector elements can be connected to the controller. The controller can be configured to control the motor so that in a starting operation of the belt drive system, the belt can move until the signal element generates a signal in a first detector element of the at least two detector elements to fix a zero point in space of the belt movement. The controller can be configured to receive and use the signal of the second detector element to check the zero point in space during normal operation of the belt drive.

A belt can be a V-belt, a multi-groove belt, a ribbed belt, a timing belt such as, for example, a toothed, notch, cog or synchronous belt, or even a chain. The belt can usually be made out of rubber or polymer. If needed, some reinforcement fibers such as, for example, cotton, polyamide, metal or even aramid, can be embedded in the rubber or polymer.

The pulleys used can be chosen respectively to the chosen belt to transfer the torque to the belt in an optimized or desired way.

The motor can be any kind of gear motor or directly connected motor such as, for example, an electric motor such as, for example, asynchronous, synchronous or stepmotor.

The frame can usually be some kind of support, or even the housing, of the machine the belt drive is used for. Commonly, sheets, or rods, of metal can be used to design and define an appropriate working area. For instance, for a gripping device, usually some kind of sorting area, or hand over areas, to grip and release any kind of device may need to be reached by the gripper.

The controller can be realized directly as the motor controller, or as a separate part. The controller can also be part or realized in a higher level machine or even process controller depending on the application of the belt drive system. As a controller, any electronic device or part of electronic device capable of realizing the required tasks can be possible such as a micro-controller, FPGA, industry or personal computer, or even can be realized as a cloud application with wireless connected devices. It can also be possible that the herein described functionalities of the controller can be distributed over several electronic devices or sub-controllers.

Part of the controller can be some kind of rotary encoder such as, for example, an absolute encoder, to control the longitudinal movement/displacement of the belt by controlling the rotation of the motor.

The rotary movement controlled by the controller with the rotary encoder can be translated into the longitudinal movement of the belt movement. To do so, the belt drive system can use the zero point in space detected by the first detection element when the signal element passes by. This can be the case during initialization of the belt drive system after switching the system on. One single point in space can be sufficient because the geometry of the belt drive system is known.

The belt drive system can be connected to a handling device for some kind of operation such as, for example, a gripper for gripping a device or an elevator or a fixed handler to move an object in a machine. The zero point in space detected by the first detection element can provide a reference point in space for the longitudinal movement of the belt. So the controller can translate the rotational movement of the motor into a longitudinal movement of the belt. This position can correspond to a park position of the handling device. During normal operation, this park position will not be reached. The second detector element can be placed in the belt drive system so that the signal element passes by during normal operation of the belt and can provide a signal to the controller to check the zero point in space As a connection between the controller and the connected devices such as, for example, the motor and the first and second detector elements, any kind of data transmission system can be possible such as a field bus, wireless connection such as, for example, WIFI, 3G, 4G or 5G or simply metal wires can be used.

In a further embodiment, the controller can send the received detector signals or directly the zero point in space to the controller to correct the motion of the belt.

In one embodiment, the controller, or the further controller, can be configured to automatically correct the zero point in space if the signal of the second detector indicates a difference to the expected zero point in space.

The controller can be configured to store the zero point in space as a reference point for the longitudinal movement of the belt to transform the rotational movement known to the controller by the rotational encoder of the motor into a longitudinal distance. The controller can be configured to receive the zero point in space detected by the first or second detector element. The controller can be configured to compare the received zero point in space with a stored zero point in space in a memory device of the controller and to store the currently received zero point in space as a reference point if a deviation of the stored and received zero point in space is detected by the controller.

In one embodiment, the controller can be configured to count the number of deviations of the zero point and to send out a message to a human interactive device when the number exceeds a threshold value.

In one embodiment, the controller can be configured to determine the distance of deviation and to sum up this absolute distance in particular separately depending on the direction of motion and to send out a message to a human interface device when the sum of the deviations exceeds a specified threshold value.

In another embodiment, the controller can be configured to determine the number of deviations and the distance of deviation and the time between the occurrence of deviations and to send out a message to a human interface device when the time between the occurrence of deviations with a specified distance fall below a threshold value.

In one embodiment, the database can be connected to the controller and configured to save the number of the occurrence of deviations, the time between the occurrence of deviations and the distance of deviation. The belt drive system can further comprise an interface configured to add parameters of the drive system into the database such as, for example, the bearings, shafts, frame elements and/or the used belt after being stripped down form the pulleys. The belt can be investigated with respect to one or more of the parameters of the list of: wear, elasticity, elongation at break, or tensile strength. The controller can be further configured to calculate an optimized maintenance point in time taking into account the data stored in the database.

The database and/or controller can be parts of a laboratory automation system. In addition, or alternatively, the database can be realized as a cloud-application or as a database installed at the manufacturer of the belt drive system. A simple text file can also be used to store the data.

In one embodiment, the controller can be configured to allocate specific damages of the bearings, shafts, frame elements and/or the belt to specific values of the occurrence of deviations, the time between the occurrence of deviations and the distance of deviation, and to send out a message to a human interface device which damage is to be expected.

This can be realized by machine learning such as, for example, a self-learning algorithm.

In one embodiment, the belt can be a toothed belt and the pulleys can be gear wheels.

In another embodiment, the signal element can be an optical element, a magnetic element, an inductive element, a capacitive element or a mechanical element and the at least two detector elements can be optical detectors, magnetic detectors, inductive detectors, capacitive detectors or mechanical detectors respectively.

In some embodiments, the signal element can be an optical opaque sheet and the detector elements can be photoelectric barriers. The signal element and the detectors can be arranged with respect to each other so that the sheet can interrupt the light beam of the photoelectric barrier when passing by.

In another embodiment, the optical opaque sheet can comprise a recess so that the light barrier of the photoelectric barrier can pass the recess when the signal elements passes the detector elements. This can have the advantage that independent of the direction the belt movement a position of the belt can be determined.

In one embodiment, the second detector element can be arranged with respect to the signal element so that the signal element passes the second detector element during between at least 30% and at least 90% of all expected movements from start to stop of the belt.

This can be especially advantageous when the zero position dedicated to the first detector element can also be used as a safety position. The safety position can be automatically ordered when the machine the belt drive system is used in needs to get in a safe state for user interaction or occurrence of an error.

A method to monitor a belt drive system is also presented. The belt drive system can comprise a frame, a driving shaft connected to a motor, a controller, a driven shaft, and two pulleys connected to the driven shaft and driving shaft respectively, and a belt. The frame can support the driving shaft and driven shaft so that the belt can be mounted on the pulleys. A signal element can be mounted on the belt so that the signal element can drive with the belt. At least two detection elements can be mounted at the frame so that the signal element can pass by the detection elements to generate a signal by passing by. The detector elements can be connected to the controller. The controller can control the motor so that in a starting operation of the belt drive system the belt can move until the signal element generates a signal in a first detector element of the at least two detector elements to fix a zero point in space of the belt motion which can correspond to a park position of the belt drive. The signal of the second detector element can be used to check the zero point in space during normal operation of the belt drive. During normal operation, the signal element does not pass by the first detector element.

In one embodiment, the controller can automatically correct the zero point if the signal of the second detector indicates a difference to the expected zero point.

In one embodiment, the controller can deviate from the signal of the second detector by one or more parameter of the list of: number of deviations, distance of deviations, time interval of deviations wherein the controller determines a severity of the deviation using these parameters.

Referring initially to FIG. 1, FIG. 1 show a first embodiment in a schematic way. A belt 10 can be mounted on two pulleys 12. One pulley 12 can be driven by a driving shaft 13. The other one can be held by a driven shaft 14. The frame which supports these shafts is not shown in FIG. 1. A motor 40 can be connected to the driving shaft. A controller 30 can be connected to the motor or, in one embodiment, to a motor controller of the motor via a motor bus 32. The motor bus can send instruction signals or correction signals to the motor controller to drive the motor 40 and hence the belt 10 in the desired position.

The belt 10 can be a V-belt, a multi-groove belt, a ribbed belt a timing belt such as a toothed, notch, cog or synchronous belt, or even a chain. The belt 10 can usually be made out of rubber or polymer. If some reinforcement fibers such as cotton, polyamide, metal or even aramid can be embedded in the rubber or polymer. Known respective devices to keep the chosen belt under suspension are not shown in FIG. 1.

A signal element 16 can be mounted on the belt 10 and can move with the belt 10. The signal element 16 can also be included in the belt 10 by molding, gluing, or form or press fitting in a recess of the belt 10.

At a distance from the belt 10 along its elongation can be a first detector element 18 and a second detector element 20. The distance between belt and first and second detector elements 18, 20 can be chosen so that the signal element 16 can generate a signal in the first and second detector element when passing by. These combinations of signal elements and detector elements can be based on magnetic, electric, optical or even mechanical effects, such as a permanent magnet and a Hall-sensor, a metal sheet and a capacitor or an inductive coil, an opaque element and a light barrier, or a mechanical rigid element which can activate a mechanical switch when passing by.

The first and second detector elements 18, 20 can be connected to the controller 30 via a sensor bus 34. The sensor bus 34 and the motor bus 32 can be realized as a standard field bus such as, for example, INTERBUS, PROFIBUS, TCNet, Ether CAT, or also as wireless signal connections. They can also be realized as one single communication network.

In the embodiment shown in FIG. 1 the first detector element 18 can be used to determine a zero point in space of the belt movement by moving the belt until the signal element 16 passes by the first detector element 18 to generate a signal which can be send to the controller 30 via the signal bus 34. This can always be done when the drive belt system is switched on to provide the controller 30 with the zero point in space of the belt movement and, afterwards, all desired movements of the belt can be calculated from this point. The zero point in space can also be used for a safety position if an error occurs in the belt drive system 1 itself or in its relevant environment.

During usual usage of the belt drive system 1, it can be possible that the signal element 16 may never pass again the first detector element 18 before switch of or restart of the system. Therefore, a second detector element 20 can be placed at a position where it can be foreseen that the signal element 16 will pass by the second detector element 20 in between at least 30% and at least 90% or always during usual operation of the belt drive system 1 for its dedicated purpose.

The distance between the first and second detector element 18, 20 can be fixed and known by the controller 30. Therefore, a second point in space of the belt movement can be fixed which can be used to monitor the belt movement. If the signal of the second detector element 20 does not fit with the expected belt movement, the controller 30 can detect a misalignment event and can send respective correction signals to the motor 40 to correct the movement of the belt 10 to the real point in space relative to the corrected zero point in space of the belt movement.

Furthermore, the controller 30 can comprise or can be connected to a database to store these misalignment events. In the database, the time of occurrence, the distance of misalignment and the frequency of occurrence of these events can be stored. Based on these events, the controller 30 can send out a message to a human interface device in signal connection to the controller 30 depending on predefined threshold values of, for example, a maximum distance of misalignment, a minimum time between the occurrence of two events, or a maximum frequency of the occurrence of the events. Further combinations of these parameters can be possible, for example, by weighting the events with the distance of the misalignment.

Once a message to a human interface device was initiated, a service technician can investigate the belt drive system 1 to identify the reason of the event. A reason can be the lost elasticity of the belt 10, the lost suspension of the suspension device to keep the belt 10 under suspension or its malfunctioning due to misalignment or broken parts, malfunction of bearings or misalignment or bending of frame elements or shafts 13, 14. Once the reason of the event is identified, the technician can input via an input device this reason into the database. This reason can then be correlated to the misalignment history related to the specific event. This can be used for future events to directly link a specific event history to the reason related to this history in the past.

In a further step, the controller 30 can control and check the misalignment event histories in the database and compare these histories to the currently ongoing misalignment events that happened to correlate the currently happening misalignment events to a specific reason and to send a message to a human interface device in advance to avoid machine downtime at an undesired time slot and/or to prevent sudden machine downtime. Furthermore, maintenance time can be preserved if it is required and not in a fixed time schedule.

Figure 2:
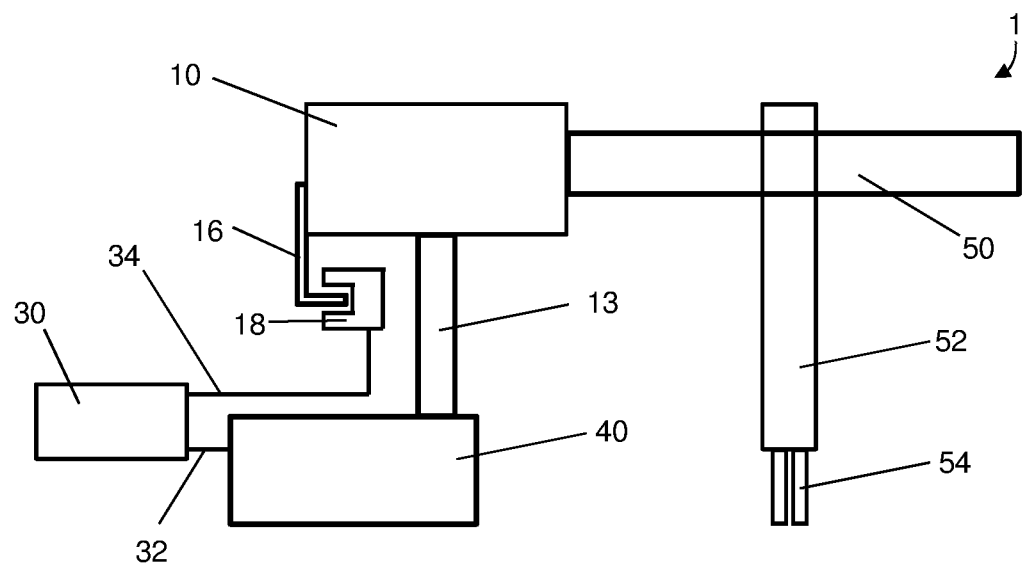
FIG. 2 illustrates a front view according to another embodiment of the present disclosure.

FIG. 2 shows a schematic front view of belt drive system 1 used in a three axis gripping device for a gripper 54. The belt drive system 1 shown can provide movement in the axis out and in of the figure plane. A second axis drive system 50 can provide for movement of the gripper 54 in the second axis and a third axis drive system 52 can provide for movement of the gripper 54 in a third axis.

The gripper 54 can comprise two or more fingers to grip any kind of device such as, for example, packages, electronic circuit elements or tube filled with a biological liquid in a diagnostics laboratory. Further applications of the gripper 54 can be possible.

The drive systems for the gripper 54 can also be arranged in an appropriate frame above in some kind of working area to grip and place devices not shown in FIG. 2.

If the gripping device is switched off, the gripper can be parked in a park-position which can usually be at a position where the gripper 54 can be positioned near the driving shaft or driven shaft. If the gripping device is switched on, the rotational movement of the motor 40 may need to be synchronized to the movement of the gripper 54. Therefore, the first detector element 18 can be placed such that when the gripper 54 is moved out of its park-position into the working area, the signal element 16 can pass by the first detector element or the signal element 16 is in the position besides the first detector element 18 to generate a signal in the first detector element 18 when the gripper 54 is in its park position. The motor 40 can comprise a rotation control system such as a rotary encoder. When the gripping device is switched on, the signal of the first detector element can be used to synchronize the rotational movement of the motor 40 with the longitudinal movement of the gripper with the belt 10 so that the signal of the rotary encoder can correspond to the position in space of the belt 10 and hence of the gripper 54 along this axis. Therefore, the first detector element and the signal element can define a zero point in space for the movement of the belt and hence of the movement of the gripper 54 along the respective axis.

After switch on, during normal operation, usually the gripper 54 can move such that the park-position will not be reached anymore. Therefore, the gripping device can comprise a second detector element 20 placed in the gripping device so that the signal element 16 can pass by the second detector element 20 during the normal operation. The signal of the first detector element can be used for initialization of the gripping device to determine the zero point in space after switch on and to drive the gripper 54 into the park-position. The signal of the second detector device 20 can be used during normal operation of the gripper 54 to check the zero pint in space and to recalibrate the signal encoder signal of the motor 40 if necessary.

The signal element 16 can be an opaque element, for example, a metal sheet and the first and second detector elements 18, 20 can be realized as light barriers. The signal element can be fixed to the belt 10. The second detector element can be hidden behind the first detector element 18 in this view of FIG. 2. The controller 30 can provide for the same functionalities as in the embodiment of FIG. 1.

The controller can be connected via the signal bus 34 to the detector elements and via motor bus 32 to the motor. The controller 30 can also be part of the motor 40, or its functionalities, can directly be realized by a motor controller of the motor 40.

Figure 3:
FIG. 3 illustrates a top view of the signal element of the embodiment shown in FIG. 2 according to an embodiment of the present disclosure.

FIG. 3 shows a top view of the signal element 16 of the embodiment shown in FIG. 2. Here the signal element 16 can be an L-shaped sheet. One arm of the L-shaped sheet can be fixed to the belt 10 and the other arm can serve as the interrupting element for the light barrier. The interrupting element can comprise a recess 17. This can allow for more precise positioning of the belt drive independent of the moving direction of the belt. This can be advantageous for the misalignment event detection as described above especially for the determination of the misalignment distance.

Figure 4:
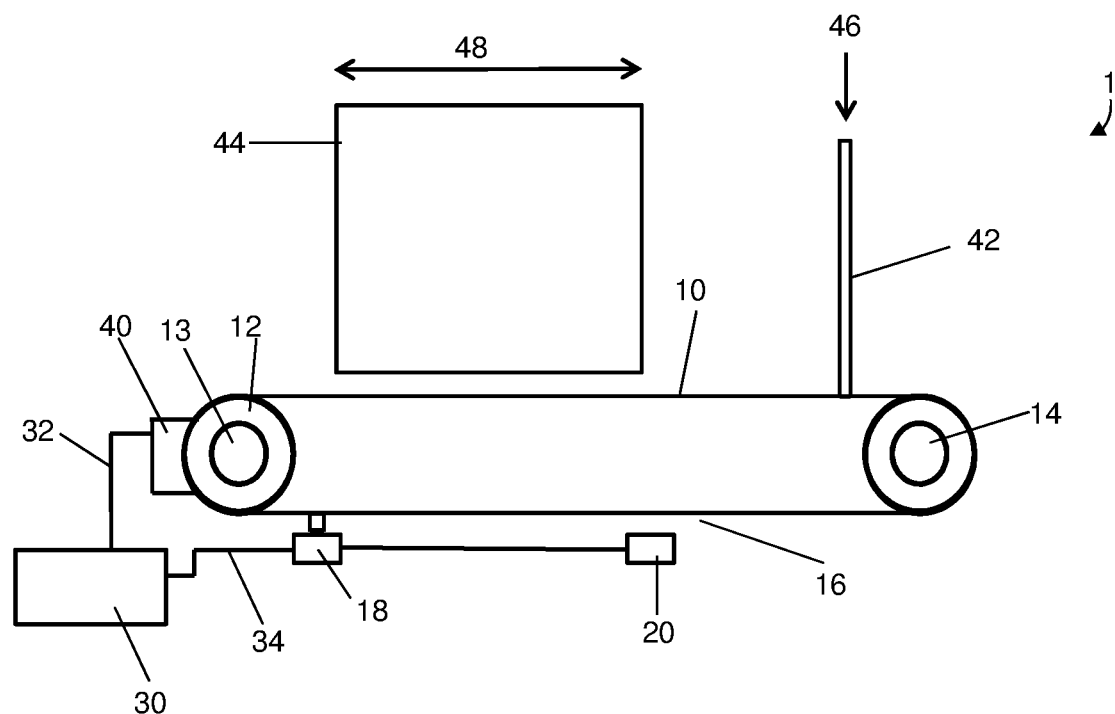
FIG. 4 illustrates the belt drive system 1 shown in FIG. 1 according to another embodiment of the present disclosure.

FIG. 4 shows a further embodiment with the belt drive system 1 shown in FIG. 1.

In this embodiment, a handling device 42 can be fixed to the belt. The handling device 42 can be used to handle elements in a handling area 44. For instance, the handling device 42 can be a gripper 54 as shown in FIG. 2. The gripper 54 can then be used to handle, for example, sort tubes filled with a biological fluid in a diagnostic laboratory tube sorter in the handling area.

If the belt drive system 1 is switched of or an emergency or error occurs the handling device 42 can be parked in a park position 46 which can correspond to the position when the signal element passes by the first detector element 18. A signal can be generated and sent to the controller 30 so that a zero point in space can be detected of the longitudinal movement of the belt and hence of the handling device. The controller 30 can control the motor 40 with its rotation encoder to drive the belt and hence the handling device to a required longitudinal position. During normal operation of the handling device 42 operating in the handling area 44 the belt's 10 longitudinal movement and hence the handling device's 42 longitudinal movement can be restricted to a longitudinal region 48. When the handling device moves in this longitudinal region 48 during normal operation fulfilling its purpose the signal element will never pass by the first detector element 18. The second detector element 20 can be placed so that the signal element 16 can generate a signal in the second detector element 20 to fix and check a zero point in space for the movement of the belt 10 and the handling device 42.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A belt drive system for driving a belt, the belt drive system comprising:
   a frame;
   a driving shaft connected to a motor;
   a controller;
   a driven shaft;
   two pulleys connected to the driven shaft and driving shaft respectively;
   a belt, wherein the frame supports the driving shaft and driven shaft so that the belt is mounted on the pulleys;
   a signal element mounted on the belt so that the signal element drives with the belt; and
   at least two detection elements mounted at the frame so that when the signal element passes by the detection elements, a signal is generated by the passing by of the signal element, wherein the detector elements are connected to the controller, wherein the controller is configured to control the motor so that in a starting operation of the belt drive system, the belt moves until the signal element generates a signal in a first detector element of the at least two detector elements to fix a zero point in space of the belt movement, wherein the controller is configured to receive and use the signal of the second detector element to check the zero point in space during normal operation of the belt drive system.

2. The belt drive system according to claim 1, wherein the zero point in space determines a park position.

3. The belt drive system according to claim 1, wherein the controller is configured to automatically correct the zero point in space, if the signal of the second detector element indicates a difference to the expected zero point in space.

4. The belt drive system according to claim 1, wherein the controller is configured to count a number of deviations of the zero point and to send out a message to a human interactive device when the number exceeds a threshold value.

5. The belt drive system according to claim 4, wherein the controller is configured to determine a distance of deviation and sum up this absolute distance separately depending on the direction of motion and to send out a message to a human interface device when the sum of the deviations exceeds a specified threshold value.

6. The belt drive system according to claim 5, wherein the controller is configured to determine the number of deviations and the distance of deviation and time between the occurrence of deviations and to send out a message to a human interface device when the time between the occurrence of deviations with a specified distance fall below a threshold value.

7. The belt drive system according to claim 6, further comprising,
a database, wherein the database is connected to the controller to save a number of the occurrence of deviations, the time between the occurrence of deviations, and the distance of deviation.

8. The belt drive system according to claim 7, further comprising,
an interface configured to add parameters of the belt drive system into the database and to investigate with respect to one or more of the parameters of the list of: wear, elasticity, elongation at break, and/or tensile strength, wherein the controller is configured to calculate an optimized maintenance point in time taking into account the data stored in the database.

9. The belt drive system according to claim 8, wherein the parameters comprises bearings, shafts, frame elements, and/or the used belt after being stripped down form the pulleys.

10. The belt drive system according to claim 8, wherein the controller is configured to allocate specific damages of the belt to specific values of the occurrence of deviations, the time between the occurrence of deviations, and the distance of deviation, and to send out a message to a human interface device which damage is to be expected.

11. The belt drive system according to claim 1, wherein the belt is a toothed belt and the pulleys are gear wheels.

12. The belt drive system according to claim 1, wherein the signal element is an optical element, a magnetic element, an inductive element, a capacitive element or a mechanical element and wherein the at least two detector elements are optical detectors, magnetic detectors, inductive detectors, capacitive detectors or mechanical detectors respectively.

13. The belt drive system according to claim 1, wherein the signal element is an optical opaque sheet and the at least two detector elements are photoelectric barriers, wherein the signal element and the detectors are arranged with respect to each other so that the sheet interrupts the light beam of the photoelectric barrier when passing by.

14. The belt drive system according to claim 13, wherein the optical opaque sheet comprises a recess so that the light barrier of the photoelectric barrier can pass the recess when the signal elements passes the detector elements.

15. The belt drive system according to claim 1, wherein the second detector element is arranged with respect to the signal element so that the signal element passes the second detector element during between at least 30% and at least 90% of all expected movements from a start to a stop of the belt.

* * * * *